United States Patent
Hirabayashi (10) Patent No.: US 7,637,174 B2
(45) Date of Patent: Dec. 29, 2009

(54) FORCE SENSOR

(75) Inventor: Yusuke Hirabayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/010,971

(22) Filed: Jan. 31, 2008

(65) Prior Publication Data
US 2008/0178688 A1    Jul. 31, 2008

(30) Foreign Application Priority Data
Jan. 31, 2007   (JP) ............ P2007-022103

(51) Int. Cl.
*G01L 5/16* (2006.01)
(52) U.S. Cl. ............ 73/862.041
(58) Field of Classification Search ............
73/862.041–862.043, 862.381, 862.391
See application file for complete search history.

(56) References Cited

U.S. PATENT DOCUMENTS

| | | | | |
|---|---|---|---|---|
| 3,643,502 A | * | 2/1972 | Birkholtz | 73/862.642 |
| 4,166,997 A | * | 9/1979 | Kistler | 338/5 |
| 4,448,083 A | * | 5/1984 | Hayashi | 73/862.042 |
| 4,454,771 A | * | 6/1984 | Shimazoe et al. | 73/862.68 |
| 5,263,375 A | * | 11/1993 | Okada | 73/862.042 |
| 6,823,744 B2 | * | 11/2004 | Ohsato et al. | 73/862.041 |
| 6,951,142 B2 | * | 10/2005 | Ohsato et al. | 73/862.041 |
| 7,458,281 B2 | * | 12/2008 | Ohsato et al. | 73/862.044 |
| 2003/0140713 A1 | * | 7/2003 | Ohsato et al. | 73/862.041 |
| 2005/0081645 A1 | * | 4/2005 | Ohsato et al. | 73/862.041 |
| 2006/0086190 A1 | * | 4/2006 | Ohsato et al. | 73/764 |
| 2007/0006668 A1 | * | 1/2007 | Hirabayashi et al. | 73/862.541 |
| 2007/0010379 A1 | * | 1/2007 | Christensen | 482/114 |
| 2007/0266797 A1 | * | 11/2007 | Hirabayashi et al. | 73/862.044 |
| 2008/0282813 A1 | * | 11/2008 | Hirabayashi et al. | 73/862.626 |

FOREIGN PATENT DOCUMENTS

| | | |
|---|---|---|
| DE | 2555231 A1 | 6/1977 |
| DE | 3924629 A1 | 2/1991 |
| JP | 5-118943 A | 5/1993 |
| JP | 2003-254843 A | 9/2003 |
| WO | WO-00/73757 A1 | 12/2000 |

* cited by examiner

*Primary Examiner*—Lisa M Caputo
*Assistant Examiner*—Freddie Kirkland, III
(74) *Attorney, Agent, or Firm*—Birch, Stewart, Kolasch & Birch, LLP (57) ABSTRACT

A force sensor including a force sensor chip and a shock absorbing device that has a damping mechanism is disclosed. The damping mechanism is disc-shaped and has an annular groove formed in at least a front surface so as to dampen external force. The damping force is adjusted by varying the depth of the groove.

28 Claims, 6 Drawing Sheets

| SHAPE | APPLIED | DETECTION PERFORMANCE EVALUATION (DETECTION SIMULATION CARRIED OUT BY STRUCTURAL ANALYSIS) | | | | | DETECTION PERFORMANCE |
|---|---|---|---|---|---|---|---|
| | | Fx DETECTION STRAIN | Fz | My | Mz | | |
| 2ND EMBODIMENT | Fx:30N | 35 [µS] | 0 | 0.5 | 0 | B1 | ○ |
| | Fz:30N | 0 | 41 | 0 | 0 | | |
| | My:30N·cm | −90 | 0 | 40 | 0 | B2 | |
| | Mz:30N·cm | 0 | 0 | 0 | 27 | | |
| CONVENTIONAL STRUCTURE (FLAT PLATE SHAPE) | Fx:30N | 67 [µS] | 0 | −6.8 | 0 | B3 | △ |
| | Fz:30N | 0 | 31 | 0 | 0 | | |
| | My:30N·cm | −140 | 0 | 35 | 0 | B4 | |
| | Mz:30N·cm | 0 | 0 | 0 | 18 | | |

FIG.10

| DESIGN | DETECTION PERFORMANCE EVALUATION (DETECTION SIMULATION CARRIED OUT BY STRUCTURAL ANALYSIS) | | | | | | DETECTION PERFORMANCE |
|---|---|---|---|---|---|---|---|
| 30N RATING | APPLIED | Fx DETECTION STRAIN [μS] | Fz | My | Mz | | ○ |
| | Fx: 30N | 35 | 0 | 0.5 | 0 | | |
| | Fz: 30N | 0 | 41 | 0 | 0 | B5 | |
| | My: 30N·cm | −90 | 0 | 40 | 0 | B6 | |
| | Mz: 30N·cm | 0 | 0 | 0 | 27 | | |
| 15N RATING | APPLIED | Fx DETECTION STRAIN [μS] | Fz | My | Mz | | ○ |
| | Fx: 15N | 26 | 0 | 0.6 | 0 | | |
| | Fz: 15N | 0 | 30 | 0 | 0 | B7 | |
| | My: 15N·cm | −85 | 0 | 51 | 0 | B8 | |
| | Mz: 15N·cm | 0 | 0 | 0 | 28 | | |

FORCE SENSOR

FIELD OF THE INVENTION

The present invention relates to a force sensor and, more particularly, to a force sensor having a shock absorbing device for adjusting a ratio between a force component transmitted to a chip and a force component transmitted to a securing part in an external force applied to an input part of the sensor.

BACKGROUND OF THE INVENTION

A six-axis force sensor has been proposed in Japanese Patent Application Laying-Open Publication No. 2003-254843 (JP 2003-254843 A). The proposed six-axis force sensor has a shock absorbing device provided to a periphery of a six-axis force sensor chip in order to minimize the magnitude of an external force that is applied to an external force application part (force action part) of the six-axis force sensor chip, which is manufactured using a semiconductor substrate. The level of the external force that can be measured by the six-axis force sensor is thereby dramatically increased, and the range of application can be increased. Further, problems related to multiaxial interference can also be resolved even when the structure of the six-axis force sensor has a shock absorbing device.

A load detector disclosed in Japanese Patent Application Laying-Open Publication No. 5-118943 (JP 05-118943 A) has an annular rigid part positioned on an outer periphery thereof; a rigid part positioned in the center thereof; and a radially provided load detection part, which connects the two rigid parts. Holes, notches, grooves, or the like are formed in the load detection part, making it possible to align the gain of the axial components of the detected load.

A semiconductor sensor chip obtained using a semiconductor manufacturing technique may be used as a component for sensing force and moment in the force sensor described above. A semiconductor substrate is used, and a component for receiving an external force (force action part) is formed in the semiconductor sensor chip. Accordingly, an upper limit also exists in regard to the amount of force that can be applied, and a risk is presented in that the semiconductor substrate chip may be damaged when the chip is subjected to an unnecessarily large force or moment.

Since no force can be detected if none is transmitted to the chip, a shock absorbing device having an external force damping mechanism for appropriately damping external forces is preferably provided so that a necessary and appropriate amount of the external force inputted to the input part of the sensor can be transmitted to the chip.

The external force damping performance of the external force damping mechanism of the shock absorbing device is conventionally determined in relation to the shape and structure of the external force damping mechanism, e.g., by manufacturing a complex shape or forming holes. However, it has not generally been possible to readily adjust the damping characteristics of the damping mechanism.

In the parts that connect the shock absorbing device and the force sensor chip, a portion of the external force is transmitted from the external force transmitting part of the shock absorbing device to the force action part of the force sensor chip via the joining surface between the shock absorbing device and the force sensor chip. A chip seat part that supports and secures the force sensor chip in place is ordinarily secured in place using a securing part of the shock absorbing device. Accordingly, a risk is presented that the application of external force may cause deformation as far as the joining surface between the chip seat part and the securing part of the shock absorbing device. As a result, in a conventional force sensor provided with a shock absorbing device, a risk is presented that delamination may occur at the joining surface between the chip seat and the securing part of the shock absorbing device.

SUMMARY OF THE INVENTION

It is therefore an object of the present invention to provide a force sensor in which external force applied to a force sensor chip can be adequately dampened; the external force can be transmitted to an action part of the chip; and a simple process can be used to adjust a force ratio between an external force component transmitted to the chip and an external force component transmitted to a securing part, with the external force having been applied to an input part of the sensor.

Another object of the present invention is to provide a force sensor that has a structure making it possible to prevent a situation in which delamination occurs at a joining surface between a securing part of a shock absorbing device and a chip seat part.

According to a first aspect of the present invention, there is provided a force sensor comprising: a force sensor chip for detecting an external force; and a shock absorbing device for damping the external force and imparting the damped external force to the force sensor chip, wherein the shock absorbing device has a damping mechanism for damping the external force, the damping mechanism having an annular groove formed in at least a front surface thereof.

The working of an annular groove into the damping mechanism (which is disc-shaped) in the force sensor described above makes it possible to manufacture a force sensor offering a higher degree of freedom in the design of sensor performance, and better reproducibility of sensor performance. Forming a groove in the front surface allows the support point, at which an external force is imparted on being applied to the input part, to be brought nearer to the chip action part, and to readily and effectively transmit the axial components of the external force to the chip action part.

In a preferred form, the damping mechanism has a disc shape, and a mechanism part for generating a damping action is formed by merely carrying out a groove working process in order to form an annular groove, e.g., in the front and rear surfaces of the damping mechanism. Accordingly, the damping force can be adjusted merely by varying the design in the depth direction of the groove. Further, the performance of the force sensor can be adjusted by appropriately controlling the groove forming process. It is also possible to readily manufacture purpose-built damping mechanisms in a highly reproducible manner. In the force sensor structure as arranged above, a connecting structure is formed between a securing part of the shock absorbing device and the chip seat, and the main component of the applied external force is transmitted via locations other than the connecting part. Accordingly, it is possible to prevent delamination from occurring at the joining surface between these two components.

Preferably, the damping mechanism includes, additionally to the annular groove formed in the front surface thereof as a first one, a second annular groove formed in a rear surface thereof.

It is desirable that the shock absorbing device has an external force input part for receiving the external force, the external force input part being connected to a center part of the damping mechanism, the annular groove in the damping mechanism being formed in a region peripheral to and about the external force input part.

In a preferred form, the annular groove is defined by side walls inclined relative to a center axis of the disc-shaped damping mechanism such that they are directed toward the force sensor chip. In short, the groove is inclined in such a manner as to be directed to the sensor chip.

Desirably, the annular groove takes the form of a ring.

In a desired form, the damping mechanism is disc shaped, while the first annular groove formed in the front surface of the damping mechanism is located radially further inwardly of the damping mechanism than the second annular groove formed in the rear surface of the damping mechanism.

It is preferred that the shock absorbing device has an external force input part for receiving the external force, the external force input part being connected to a center part in the front surface of the damping mechanism, the first annular groove formed in the front surface of the damping mechanism and the second annular groove formed in the rear surface of the damping mechanism being provided in a region peripheral to and about the external force input part.

According to a second aspect of the present invention, there is provided a force sensor comprising: a force sensor chip for detecting an external force; and a shock absorbing device for damping the external force and imparting the damped external force to the force sensor chip, wherein the shock absorbing device has a damping mechanism for damping the external force, the damping mechanism having an annular groove formed in a rear surface thereof.

Desirably, the damping mechanism is disc shaped.

Preferably, the shock absorbing device has an external force input part for receiving the external force, the external force input part being connected to a center part of the damping mechanism, the annular groove formed in the damping mechanism being provided in a region peripheral to and about the external force input part.

In a preferred form, the annular groove is defined by side walls inclined relative to a center axis of the disc-shaped damping mechanism such that they are directed toward the force sensor chip.

Preferably, the annular groove takes the form of a ring.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

The force sensor according to the present invention has a force sensor chip for sensing external force (axial force), and detecting the external force; and a shock absorbing device, which has a damping mechanism (shock absorbing mechanism) for damping the applied external force by a prescribed amount, and transmitting the dampened external force to the force sensor chip. The force sensor of the present embodiment is preferably disc-shaped.

The force sensor chip that is used in the present embodiment is manufactured using a semiconductor substrate, and functions as a six-axis force sensor. A six-axis force sensor has a sensor function for detecting force and moment in each of three perpendicular axes (X axis, Y axis, and Z axis).

The force sensor of the first embodiment will be described with reference to FIGS. 1 through 4.

Figure 1:
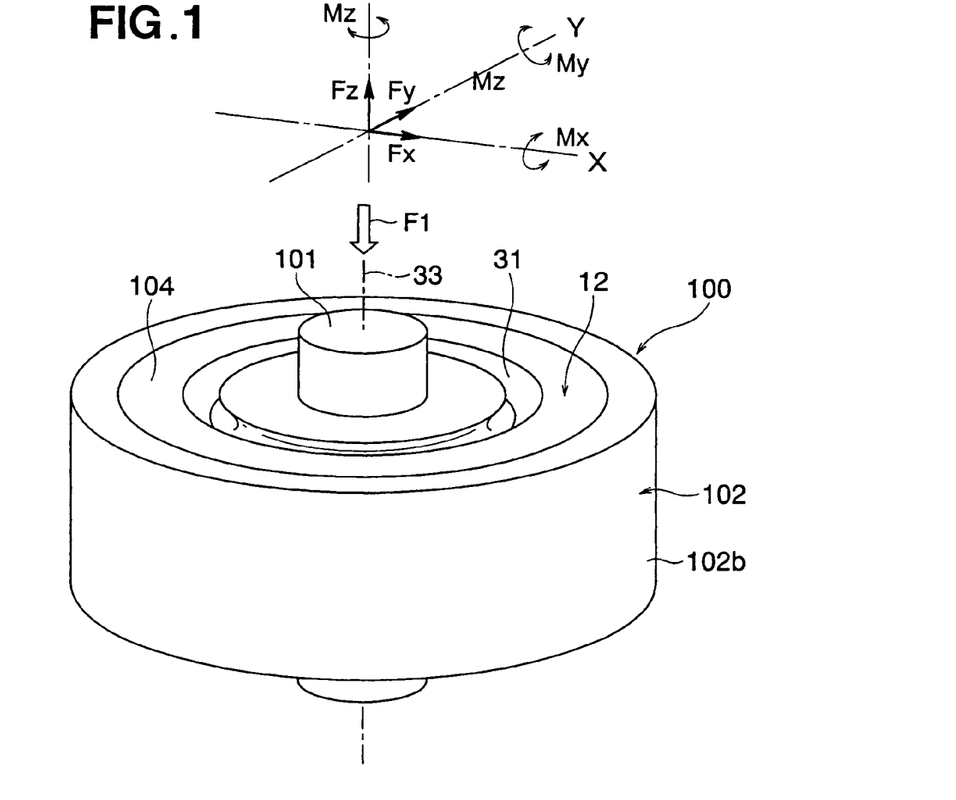
FIG. 1 is a perspective view illustrating a force sensor according to a first embodiment of the present invention.
Figure 2:
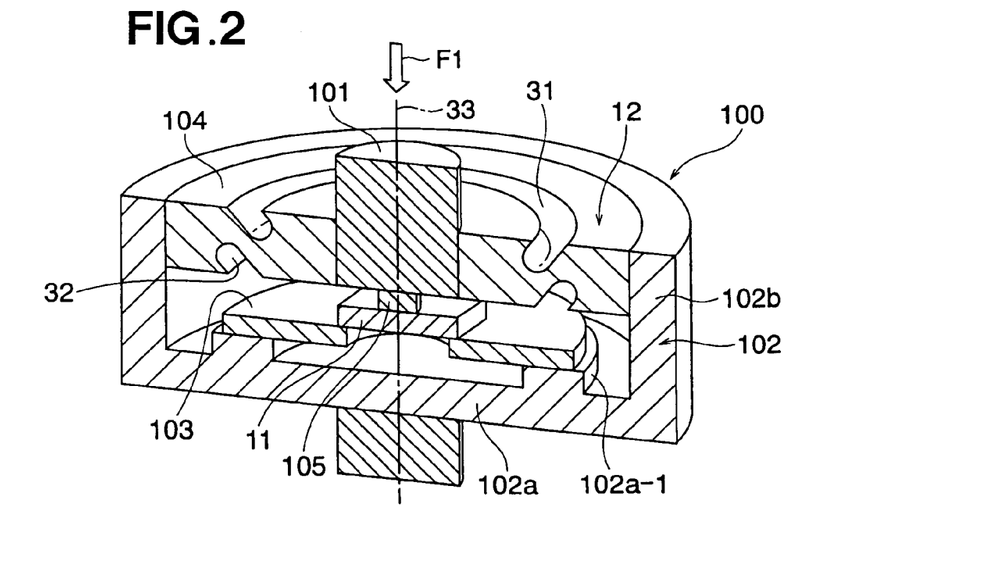
FIG. 2 is a sectional perspective view of the force sensor according to the first embodiment.
Figure 3:
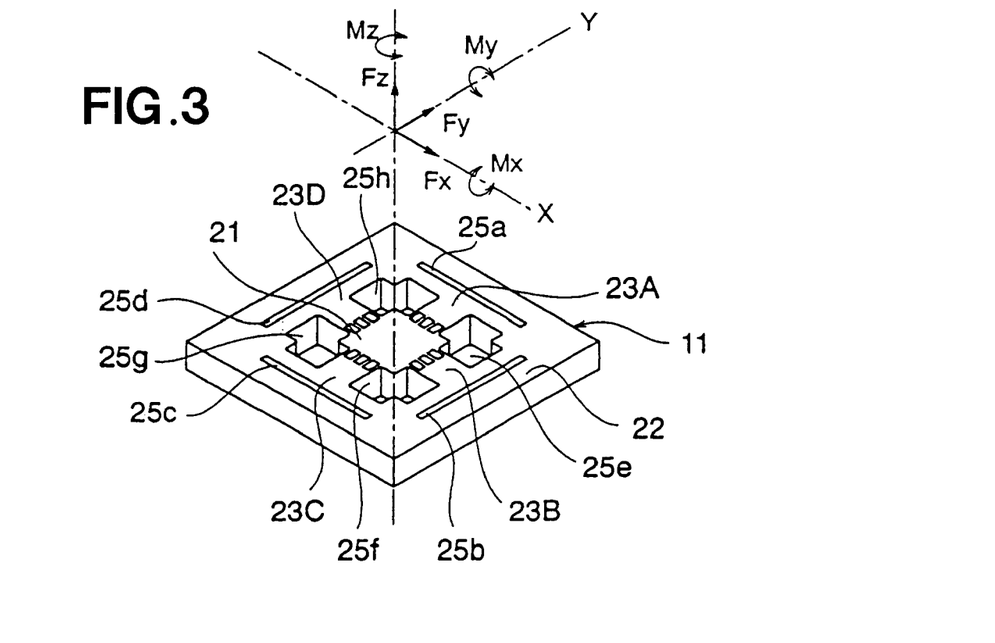
FIG. 3 is a perspective view illustrating an example of a force sensor chip shown in of FIG. 2.
Figure 4:
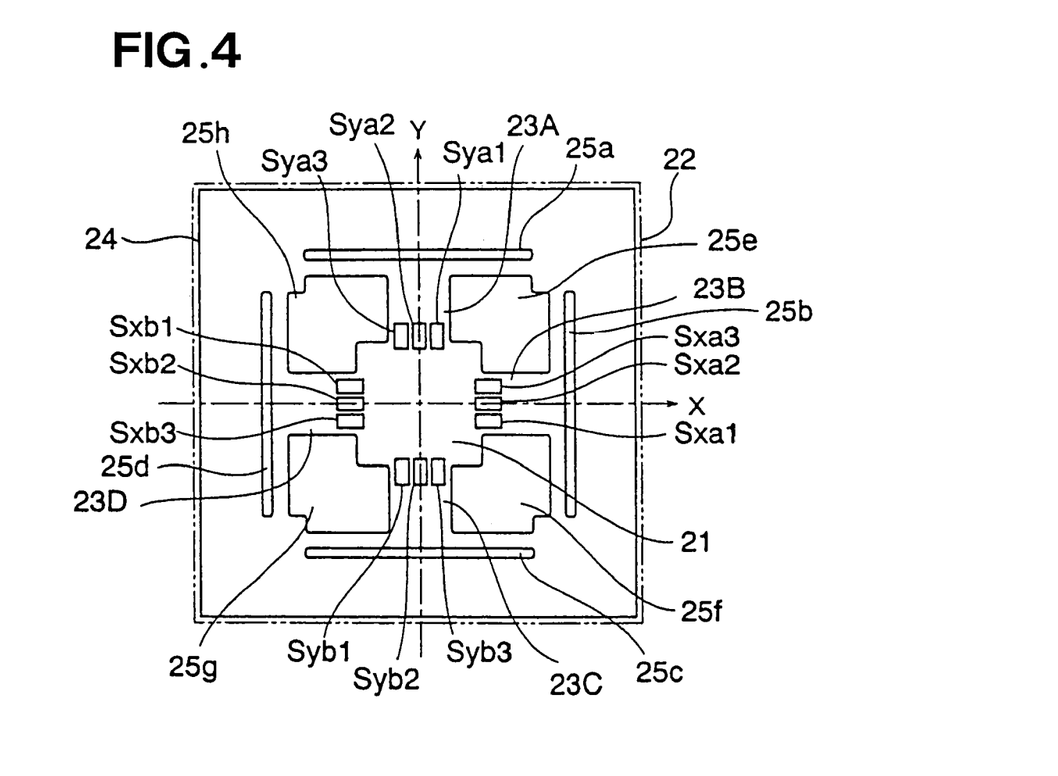
FIG. 4 is a top plan view of the force sensor chip of FIG. 3.

As shown in FIGS. 1 and 2, a force sensor 100 of the first embodiment is configured from a force sensor chip 11 and a shock absorbing device 12. FIGS. 3 and 4 show an example of the configuration of the force sensor chip 11. An example of the configuration of the force sensor chip 11 will be described with reference to FIGS. 3 and 4, before the configuration of the force sensor 100 is described. The force sensor chip 11 is configured to detect force using a strain resistance element.

According to FIGS. 3 and 4, the force sensor chip 11 is a semiconductor sensor element, which is formed using a semiconductor substrate and employing a semiconductor manufacturing process technique. The force sensor chip 11 preferably has a square shape as viewed from the top, and has the shape of a flat plate.

In FIG. 3, the force sensor chip 11 has an action part 21, which has a substantially square shape and is positioned in a center part of the chip; a square ring-shaped support part 22, which is peripherally positioned so as to surround the action part 21; and four T-shaped connecting parts 23A, 23B, 23C, 23D, which are positioned between the action part 21 and the support part 22, connect the parts together correspondingly with respect to each part on the four sides.

The four connecting parts 23A through 23D are T-shaped beams, and have a bridge part and an elastic part. As shown in FIG. 4, three strain resistance elements (Sxa1, Sxa2, Sxa3), (Sxb1, Sxb2, Sxb3), (Sya1, Sya2, Sya3), (Syb1, Syb2, Syb3) are preferably disposed on one of the surfaces (front surface 24) in the boundary part where each of the four T-shaped connecting parts 23A to 23D are connected to the action part 21.

As shown in FIG. 3, the action part 21, the support part 22, and the connecting parts 23A through 23D are formed from eight through-holes 25a through 25h, which are formed in the force sensor chip 11. The shape and forming position of the through-holes 25a through 25h are adjusted so that the connecting parts 23A through 23D will deform and the action part 21 will be displaced in response to the external force that is applied to the action part 21, and so that the force can be detected with a high degree of accuracy.

In FIGS. 3 and 4, the X axis, Y axis, and Z axis, which are mutually perpendicular as shown in the drawings, are defined with respect to the force sensor chip 11. In FIG. 3, the axes are conveniently designated as being "up," "down," "right," and "left" with respect to the force sensor chip 11. In FIG. 4, the horizontal axis is indicated by the X axis, and the longitudinal axis is indicated by the Y axis. In FIG. 3, the force and moment for each axis are indicated by arrows and symbols. In relation to the three axes on the Cartesian coordinate system (X axis, Y axis, and Z axis), Fx refers to a force in the X-axis direction; Fy refers to a force in the Y-axis direction; and Fz refers to a force in the Z-axis direction. Mx refers to a moment applied in the rotational direction with respect to the X axis; My refers to a moment applied in the rotational direction with respect to the Y-axis; and Mz refers to a moment applied in the rotational direction with respect to the Z axis.

When, the six axial components (axial forces); i.e., Fx[N], Fy[N], Fz[N], Mx[N·cm], My[N·cm], and Mz[N·cm] are directly applied to the action part 21 of the force sensor chip 11 to which the support part 22 is secured, the connecting parts 23A through 23D deform according to the force that is applied. The strain resistance elements (Sxa1, Sxa2, Sxa3), (Sxb1, Sxb2, Sxb3), (Sya1, Sya2, Sya3), (Syb1, Syb2, Syb3) will be subjected to strain according to the deformation of the connecting parts 23A through 23D, and the magnitude and direction of the six-axis force can accordingly be detected by analyzing a signal from the strain resistance elements (Sxa1, Sxa2, Sxa3), (Sxb1, Sxb2, Sxb3), (Sya1, Sya2, Sya3), (Syb1, Syb2, Syb3).

In the actual force sensor chip 11, a plurality of electrodes and wiring for connecting the electrodes and the strain resistance elements are provided to the peripheral edge part of the chip. However, these parts are not shown in FIGS. 3 and 4 since they are not the main point of the present invention.

The structure of the force sensor 100 will be described below with reference to FIGS. 1 and 2.

As described above, the force sensor 100 has a force sensor chip 11 and a shock absorbing device 12.

The shock absorbing device 12 is configured from a cylindrical rod-shaped input part 101 to which is directly applied an external force F1, which is imparted from the exterior; a relatively flat, bottomed tubular sensor securing part 102 (which is short in the axial direction) for securing the force sensor 100 at a prescribed location; an annular chip seat 103 for attaching the force sensor chip 11; a disc-shaped damping mechanism 104 that has a damping function (or a shock absorbing function); and a transmitting part 105 for connecting the input part 101 and the action part 21 (see FIG. 3) of the force sensor chip 11.

The external force F1 is any one of the six axial components (Fx; Fy, Fz, Mx, My, Mz,) described above.

The sensor securing part 102 has a bottom part 102a and a tubular part 102b. The chip seat 103 for securing the force sensor chip 11 is secured to a ring-shaped protruding part 102a-1, which protrudes upward from an upper surface of the bottom part 102a of the sensor securing part 102. As shown in FIG. 2, the chip seat 103 can be formed as a member that is separate from the sensor securing part 102, and can also be formed as a part of the sensor securing part 102.

The support part 22 of the force sensor chip 11 shown in FIG. 3 is secured to the disc-shaped chip seat 103.

The disc-shaped damping mechanism 104 and the discoid chip seat 103 are disposed in relatively close proximity in a parallel positional relationship. A hole is formed in the center parts of both the damping mechanism 104 and the chip seat 103. The input part 101, the sensor securing part 102, and the damping mechanism 104, which are formed as separate components, are then assembled and connected. The columnar input part 101 is inserted through and secured in the hole in the center of the damping mechanism 104. The damping mechanism 104 is secured to an opening of the tubular part 102b of the sensor securing part 102.

In a portion of the hole in the center part of the chip seat 103, the force sensor chip 11 is secured at a position above the chip seat 103. The rod-shaped transmitting part 105 connects a lower surface the input part 101 and the action part 21 of the force sensor chip 11.

Ring-shaped grooves 31, 32 are preferably formed by forming grooves in the upper surface (front surface) and the lower surface (back surface) of the damping mechanism 104, as shown in FIG. 2. The two ring-shaped grooves 31, 32 are formed in a concentric positional relationship around a center axis 33 that is shared by the input part 101 and the damping mechanism 104. Inner peripheral wall surfaces and outer peripheral wall surfaces of the grooves 31, 32 are formed so as to be inclined, and the bottom surfaces thereof are formed so as to be curved. The inner peripheral wall surfaces and outer peripheral wall surfaces of the grooves 31, 32 are inclined with respect to the center axis 33 of the damping mechanism 104 or the like, so that the direction of incline is oriented toward the force sensor chip 11, which is positioned therebelow. As a result, the cross-sectional shape of the portion formed in the space between the groove 31 and the groove 32 is formed substantially in an N shape, as can be seen in the cross-section of the left portion shown in FIG. 2.

The damping mechanism 104 has a disc shape, and working the grooves 31, 32 into the upper and lower surfaces thereof makes it possible to increase the deformability corresponding to the external force F1, dampen the external force F1, and impart some of the external force F1 to the action part 21 (FIG. 3) of the force sensor chip 11. Forming grooves in the upper and lower surfaces of the damping mechanism 104 adjusts the depth of the grooves 31, 32 (in the direction of incline), thereby making it possible to adjust the sensing performance (detection performance) with respect to the external force F1. As a result of forming grooves in the upper surface, when an external force is applied to the input part, the center of displacement of the input part can be brought near to the chip action part, and the axial components of the external force can be readily and effectively transmitted to the chip action part.

In the force sensor 100 of the first embodiment, the main component of the external force F1 imparted to the input part 101 is transmitted to the damping mechanism 104, and a portion thereof is transmitted and applied to the action part 21 of the force sensor chip 11 via the transmitting part 105. The force sensor chip 11 deforms on sensing the damped portion of the external force F1, and the strain resistance elements described above detect the external force F1.

The grooves 31, 32 are preferably formed in the upper and lower surfaces of the damping mechanism 104, but optionally only the groove 31 is formed in the front surface or only the groove 32 is formed in the rear surface in order to adjust the damping of the force.

According to the force sensor 100 of the first embodiment, forming the grooves 31, 32 in the disc-shaped damping mechanism 104 allows the external force F1 to be effectively dampened and transmitted to the center of the force sensor chip 11. Furthermore, changing the depth of the grooves in the direction of inclination allows the detection performance to be readily adjusted. The constituent elements of the damping mechanism 104 are formed as separate components; therefore, the force sensor can be mass produced merely by modifying the design thereof for each specification.

The input part 101, sensor securing part 102, the chip seat 103, the damping mechanism 104, and the transmitting part 105 of the force sensor 100 are generally formed using a metal (e.g., aluminum, carbon steel, and stainless steel), a plastic, a ceramic, glass, or another solid material.

Two or more types of metal may be used as this material. However, concerns related to the manufacturing process and costs make it more practical to use a single type of metal to form a sensor case for the input part, the sensor securing part, or the like; and then to adjust the deformation action by adjusting the shape, size, and manner of forming the groves or holes.

The chip seat 103 preferably has an insulation property, and is preferably of a material having a coefficient of thermal expansion approximating that of the force sensor chip 11, particularly from the perspective of maintaining a high degree of sensor accuracy in the force sensor 100. If the coefficient of thermal expansion does not approximate that of the force sensor chip, the force sensor chip 11 may expand due to changes in the external temperature. This will cause the force sensor 100 to produce detection error (temperature drift). A bias voltage is normally applied and the effect of noise is removed in order to acquire a detection signal from the force sensor 100. However, the chip seat 103 preferably has insulation properties in order to prevent the bias voltage being applied to other components. From this perspective as well, the material is preferably a ceramic or glass.

Glass in particular is preferably selected because the chip seat 103 is connected to the tubular part 102b of the sensor securing part 102 and the force sensor chip 11 by anodic bonding. An adhesive based on an epoxy resin or the like can be used, as conventionally performed, instead of anodic bonding. A phenol-based adhesive having exceptional heat resistance may be used, depending on the mode in which the sensor is used.

Figure 5:
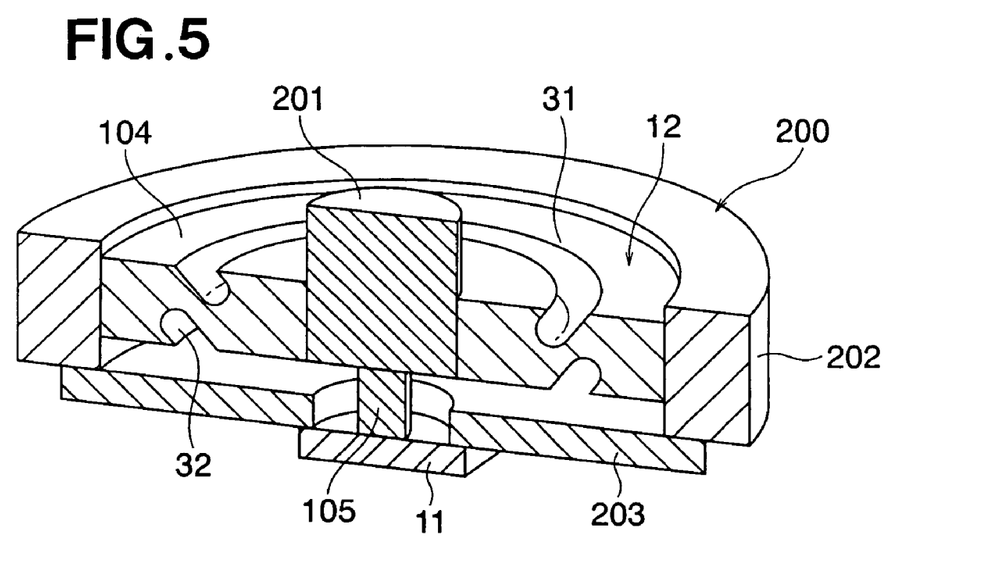
FIG. 5 is a sectional perspective view illustrating a force sensor according to a second embodiment of the present invention.

A force sensor 200 of the second embodiment will be described below with reference to FIG. 5. In FIG. 5, elements that are the same as or similar to the elements shown in FIG. 2 are indicated by the same symbols, and a detailed description thereof is omitted.

The force sensor 200 of the second embodiment has a force sensor chip 11 and a shock absorbing device 12. The shock absorbing device 12 is configured from a cylindrical rod-shaped input part 201 to which is directly applied an external force F1, which is imparted from the exterior; a relatively flat, bottomed tubular sensor securing part 202 (which is short in the axial direction) for securing the force sensor 200 at a prescribed location; a discoid chip seat 203 for attaching the force sensor chip 11; a disc-shaped damping mechanism 104 that has a damping function (or a shock absorbing function); and a transmitting part 105 for connecting the input part 201 and the action part 21 of the force sensor chip 11.

A hole is formed in a center part of the discoid chip seat 203. The force sensor chip 11 is secured in a portion of the hole in the center part of the chip seat 203, at a position that is below (outside) the chip seat 203. The rod-shaped transmitting part 105 is disposed through the hole in the chip seat 203. A lower surface of the input part 201 is connected to the action part 21 of the force sensor chip 11 (see FIG. 3).

The damping mechanism 104 in the force sensor 200 has grooves 31, 32 in the same manner as described in the first embodiment shown in FIG. 2. The damping mechanism has a function for damping the external force F1 and imparting a part of the external force to the force sensor chip 11.

In the force sensor 100 of the first embodiment, the chip seat 103 and the external force transmitting part 105 are connected to different sides (front and rear) of the force sensor chip 11 (dual surface joined structure), whereas in the force sensor 200 of the second embodiment, the chip seat 203 and the transmitting part 105 are connected on the same side of the force sensor chip 11 (single surface joined structure).

In a dual surface joined structure, conventionally, the joining surface between the chip seat and the securing part of the shock absorbing device is separated from the damping mechanism; therefore, no risk is presented of delamination at the joining surface. However, in a single surface joining structure, the joining surface between the chip seat and the securing part of the shock absorbing device is positioned near the damping mechanism, and there is therefore a risk that delamination may occur. However, even in the single surface joining structure, forming grooves in a lower surface of the damping mechanism causes the center of the deformation of the damping mechanism to separate from the joining surface of the chip seat and the securing part of the shock absorbing device. Therefore, force is not readily transmitted to the joining surface, and delamination at the joining surface can be prevented.

Using a layout such as that shown with the shock absorbing device 12 in FIG. 5 allows all constituting parts of the shock absorbing device 12 to be located on the same side of the force sensor chip 11 (on top of the force sensor chip 11 in FIG. 5). The input part 201, the damping mechanism 104, the sensor securing part 202, the transmitting part 105, and the chip seat 203 are integrally formed, and can then be latterly attached to the force sensor chip 11. This thereby contributes to simplifying the process for manufacturing the force sensor 200. Integrally forming all or some of the components, from the input part 201 to the damping mechanism 104, is associated with a reduction in the amount of adhesive required and allows increased toughness.

The thickness of the force sensor 200 of the second embodiment can be further reduced in the vertical direction. In the force sensor 200, the transmitting part 105, the damping mechanism 104, and the chip seat 203 are disposed on the same surface of the force sensor chip 11 in order to reduce thickness. The damping mechanism 104 is provided to an inner periphery of the sensor securing part 202, and the transmitting part 105 is provided to an inner periphery of the chip seat 203.

Figure 6:
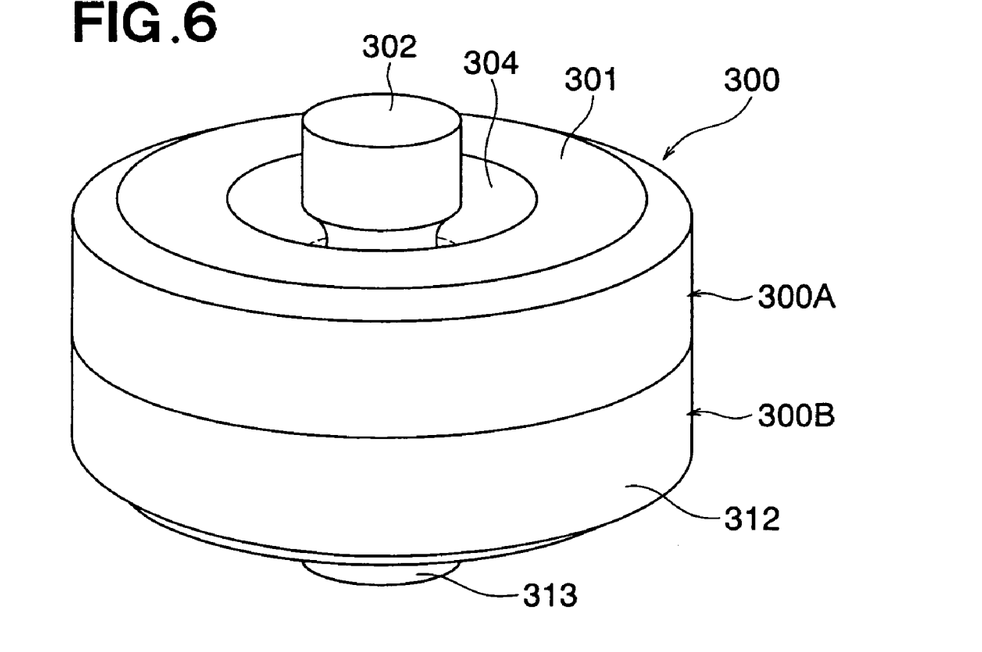
FIG. 6 is a perspective view of a force sensor according to a third embodiment of the present invention.
Figure 7:
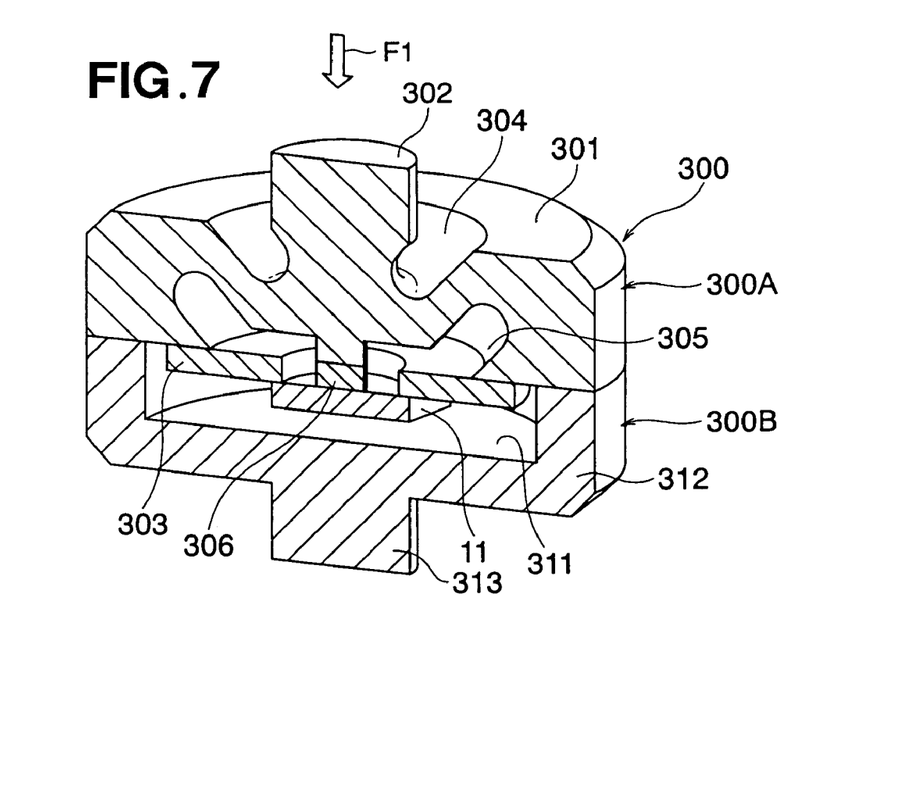
FIG. 7 is a sectional perspective view of the force sensor according to the third embodiment.
Figure 8:
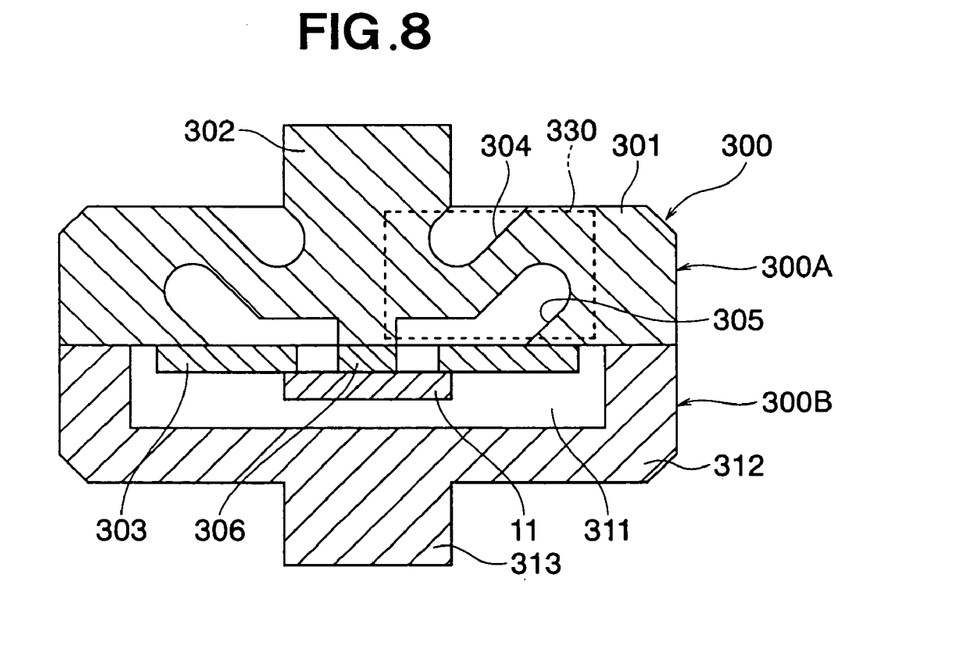
FIG. 8 is a sectional view of the force sensor of the third embodiment.

FIGS. 6 through 8 show a force sensor 300 according to a third embodiment of the present invention. The force sensor 300 according to the third embodiment is configured using the force sensor 200 of the second embodiment, which has a single surface joining structure as shown in FIG. 5.

The force sensor 300 of the third embodiment is configured from a casing upper part 300A and a casing lower part 300B. The casing upper part 300A and the casing lower part 300B are assembled and integrated using a screw assembly structure, joining, or another technique.

The casing upper part 300A has a disc-shaped damping mechanism 301, which has a large radius and is positioned in the center of the casing upper part; an external force input part 302 that forms a columnar protruding part, and that is formed on an upper surface of the damping mechanism; and a chip seat 303 that is attached to a lower surface of the damping mechanism 301.

The damping mechanism 301 and the external force input part 302 are formed as an integrated unit, and a groove 304 is formed on the inside along the radial direction on the periphery of a base section of the external force input part 302 on the front surface. A groove 305 is formed on the outside along the radial direction in a lower surface (rear surface) of the damping mechanism 301. The groove 304 corresponds to the groove 31 in the second embodiment, and the groove 305 corresponds to the groove 32 in the second embodiment. A thin-walled part is formed by the two grooves 304, 305, thereby creating the damping function of the damping mechanism 301.

The chip seat 303 is prepared as a member that is separate from the damping mechanism 301 and the external force input part 302. A peripheral edge part of the chip seat 303 is bonded to the lower surface of the damping mechanism 301. A hole is formed in the center of the chip seat 303, and the force sensor chip 11 is secured opposite the region of the hole.

A center part of the lower surface of the damping mechanism 301 is connected to the action part 21 (see FIG. 3) in the center of the force sensor chip 11 via a transmitting part 306.

An external force receiver is attached to the external force input part 302 via a connecting member or the like.

A space 311 is formed between the casing upper part 300A and the casing lower part 300B once these components are in a connected state. The force sensor chip 11 is disposed in this space 311.

The casing lower part 300B is an element that is used to secure the force sensor 300 to a securing member to which the force sensor 300 is to be secured (not shown). The casing lower part 300B is configured from a disc-shaped part 312, which is connected to the casing upper part 300A; and a connecting part 313, which forms a columnar protruding part that is formed in a lower surface of the disc-shaped part 312. The disc-shaped part 312 and the connecting part 313 are integrally formed. The connecting part 313 is secured in place on the securing member interposed by a connecting member (not shown).

According to the force sensor of the third embodiment, the external force F1 applied to the external force input part 302 is dampened by the damping action provided by the damping mechanism 301 of the casing upper part 300A. A portion of the external force is imparted to the action part of the force sensor chip 11 via the transmitting part 306.

As shown in FIG. 8, a cross-section region 330 is a region that provides a damping action. The cross-section region includes the upper groove 304 and the lower groove 305 in the damping mechanism 301. The dimensions of the region 330 in a thickness direction and in a radial direction at a thickness position can be appropriately varied according to the design of the performance (detection performance, load bearing performance, or the like) of the force sensor 300.

The upper groove 304 and the lower groove 305 in the damping mechanism 301 can be varied in regard to the groove depth in the direction of inclination, the position in the radial direction, and the position in the direction of the axis 33, making it possible to dramatically vary the sensor performance; i.e., the magnitude of the detection performance. The rated load in particular can be readily adjusted in accordance with the groove depth in the direction of incline and the position at which the thin-walled part is formed by the upper and lower grooves. The latitude and efficiency relating to the design of the force sensor 300 can accordingly be improved.

Figure 9:
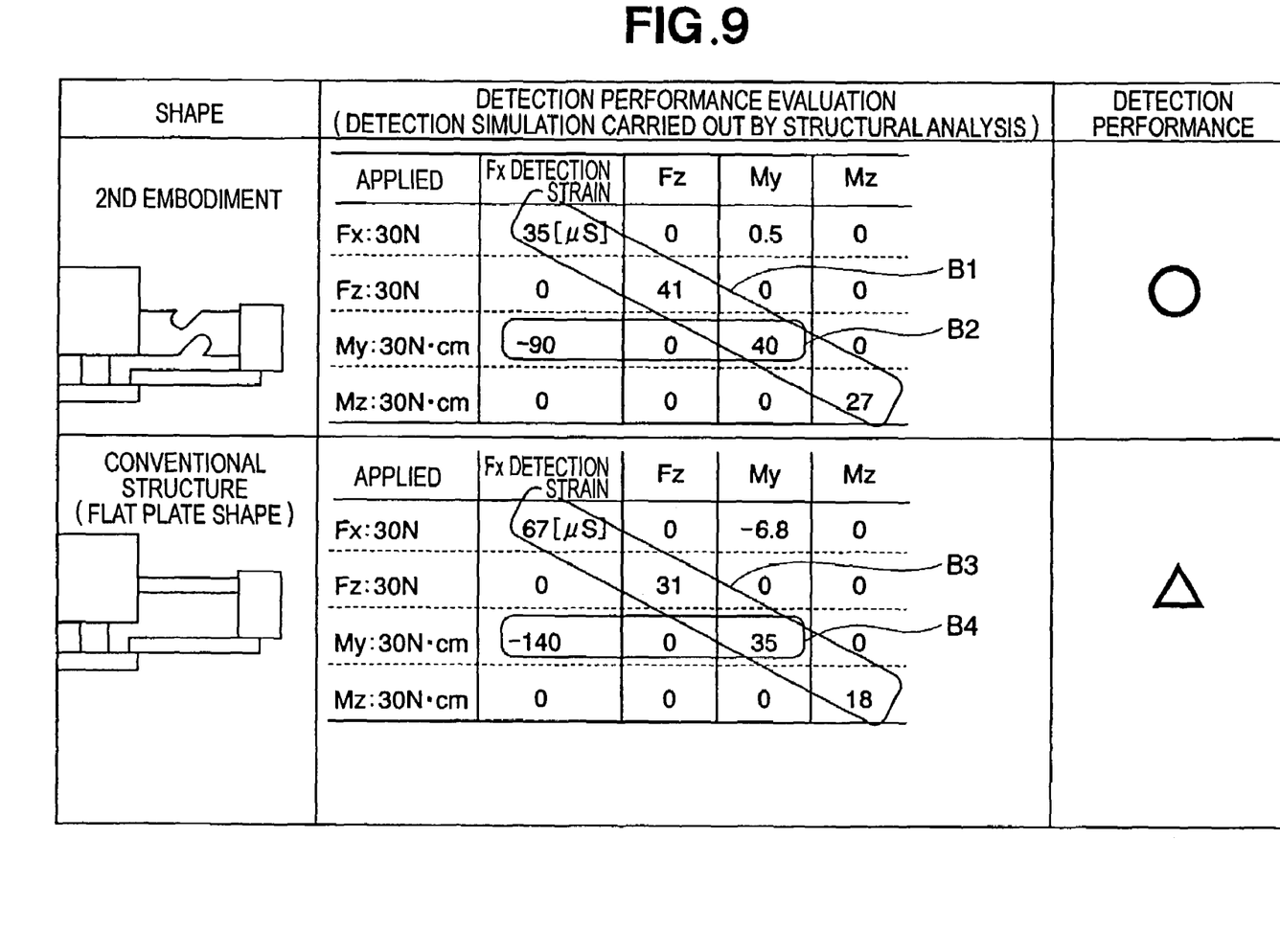
FIG. 9 is a view showing a comparison between the detection performance of the force sensor according to the second embodiment and that of a conventional force sensor.

The following is a description, made with reference to FIG. 9, of a comparison between the detection performance of the force sensor of the second embodiment shown in FIG. 5 and the detection performance of a force sensor that has a conventional structure (in the shape of a flat plate).

In FIG. 9, the upper level shows the force sensor of the second embodiment, and the lower level shows the force sensor that has the conventional structure (in the shape of a flat plate). In FIG. 9, the following items are shown in the horizontal direction: "shape," "detection performance evaluation (detection simulation carried out by structure analysis)," and "detection performance ($\bigcirc$ or $\triangle$)." In the detection performance evaluation column, a detection evaluation performance table is shown for both the second embodiment and the conventional structure.

In the detection evaluation performance table of the second embodiment, the detection strain was 27 $\mu$S or greater, and an adequate signal strength was maintained, as shown in block B1. Moreover, interference from other axes can be adequately reduced; e.g., My is 90/40=2.2, as shown in block B2. Accordingly, the force sensor of the second embodiment has high detection performance.

In contrast, the detection strain in the detection evaluation performance table of the conventional structure was 18 $\mu$S or greater, as shown in block B3. Moreover, adequate detection performance cannot be obtained in the force sensor that has a conventional structure; e.g., in regards to interference from other axes, My is 140/35=4, as shown in block B4.

The detection performance of the force sensor according to the present invention will be described below from the perspective of design, with reference to FIG. 10.

Figure 10:
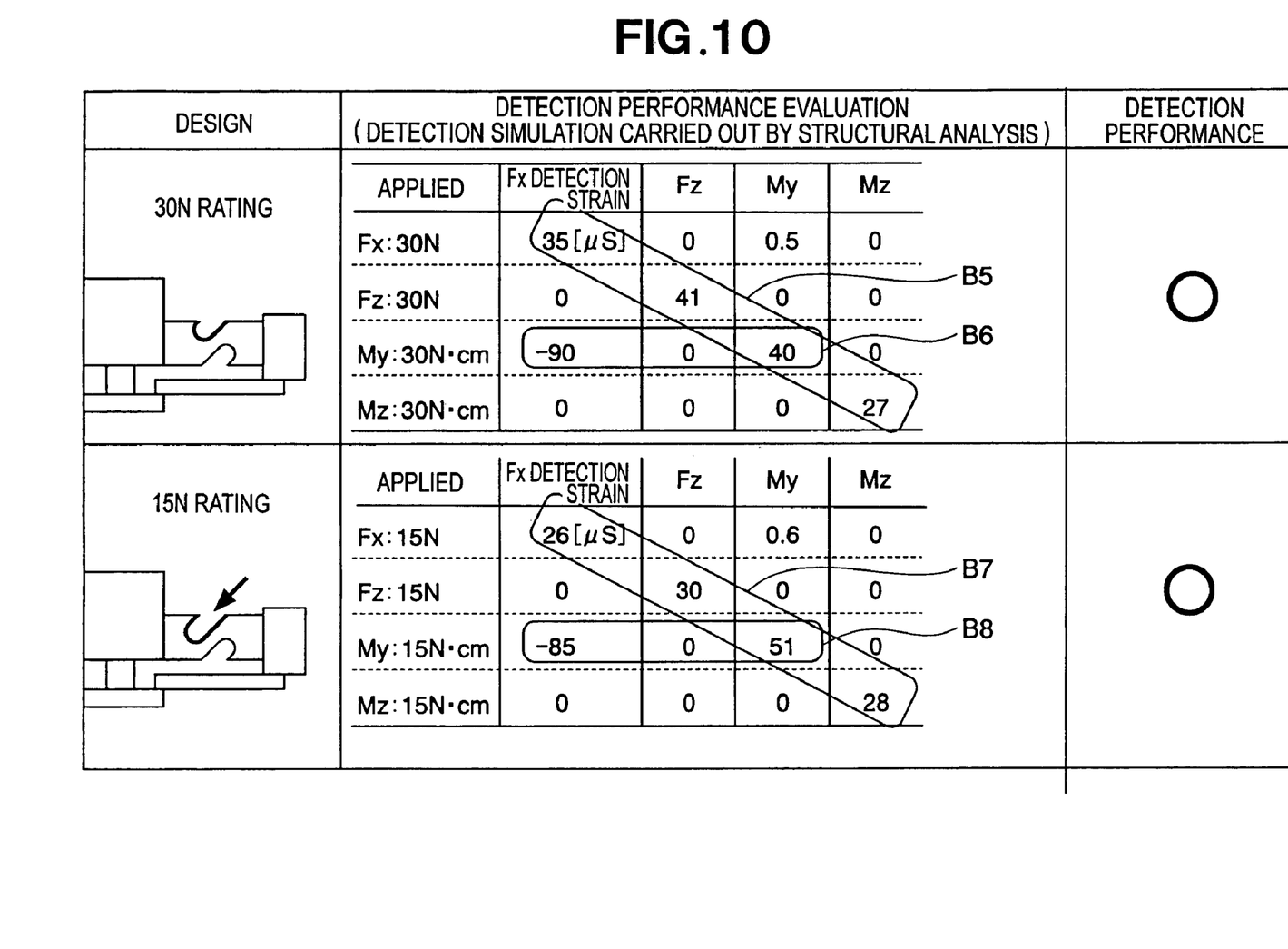
FIG. 10 is a view showing a comparison between the detection performance of a 30 N rated sensor and that of a 15 N rated sensor in the force sensor according to the second embodiment.

In FIG. 10, the upper level shows a structure of a force sensor of the second embodiment that has a 30 N rating; and the lower level shows the structure of a force sensor of the second embodiment that has a 15 N rating. In FIG. 10, the following items are shown in the horizontal direction: "design," "detection performance evaluation (detection simulation carried out by structure analysis)," and "detection performance ($\bigcirc$ or $\triangle$)." In the detection performance evaluation column, a detection evaluation performance table is shown for both force sensors. In the 15 N-rated force sensor, the groove on the front surface, which is positioned on the upper side, is made deeper than in the 30 N-rated force sensor to adjust the rating.

In the detection evaluation performance table of the 30 N-rated sensor, the detection strain was 27 $\mu$S or greater, and an adequate signal strength was maintained, as shown in block B5. Interference from other axes can be adequately reduced; e.g., My is 90/40=2.2, as shown in block B6. In the detection evaluation performance table of the 15 N-rated sensor, the detection strain was 26 $\mu$S or greater, as shown in block B7. Adequate detection performance can be obtained in this case as well; e.g., in regard to interference from other axes, My is 85/51=1.6, as shown in block B8.

As described above, using the design of the force sensor that has a 30 N load capacity rating as a base, and varying the shape of the groove (e.g., the depth) makes it possible to design a force sensor that has a 15 N load capacity rating and that has favorable detection performance. Accordingly, adjusting the shape of the groove makes it possible to obtain high design latitude.

The configuration, shapes, sizes, and the placement relationships described in the first to third embodiments above are merely provided as a conceptual illustration to the extent that the present invention can be conceived and implemented. The numerical values and the components (materials) of the structures of these embodiments are also merely given as examples. Accordingly, the present invention is not limited by the embodiments described above, and may be fashioned into a variety of modes as long as no departure is made from the technical scope indicated in the claims.

The present invention is used as a force sensor for detecting axial force or a load in a work machine, pointing device, or the like.

Obviously, various minor changes and modifications are possible in light of the above teaching. It is therefore to be understood that within the scope of the appended claims the invention may be practiced otherwise than as specifically described.

What is claimed is:

1. A force sensor comprising:
   a force sensor chip for detecting an external force; and a shock absorbing device for damping the external force and imparting the damped external force to an action part of the force sensor chip, wherein the shock absorbing device has a damping mechanism for damping the external force, the damping mechanism having an annular groove formed in at least a front surface thereof, wherein the action part is positioned in a center part of the force sensor chip, a support part is peripherally positioned so as to surround the action part, connecting parts are positioned between and connecting the action part and the support part, and a plurality of strain resistance elements are disposed on one surface of the force sensor chip in a boundary part between each of the connecting parts and the action part, and wherein the annular groove is defined by two side walls inclined relative to a center axis of the damping mechanism such that the two side walls are directed toward the force sensor chip.

2. The sensor of claim 1, wherein the damping mechanism is disc-shaped.

3. The sensor of claim 1, wherein the damping mechanism includes, additionally to the annular groove formed in the front surface thereof as a first one, a second annular groove formed in a rear surface thereof.

4. The sensor of claim 3, wherein the shock absorbing device has an external force input part for receiving the external force, the external force input part is connected to a center part in the front surface of the damping mechanism, and the first annular groove formed in the front surface of the damping mechanism and the second annular groove formed in the rear surface of the damping mechanism are formed in a region peripheral to and about the external force input part.

5. The sensor of claim 3, wherein the second annular groove is defined by two side walls inclined relative to the center axis of the damping mechanism such that they are directed toward the force sensor chip, and wherein each of the two side walls of the first annular groove and each of the two side walls of the second annular groove are inclined at the same angle relative to the center axis of the damping mechanism.

6. The sensor of claim 1, wherein the shock absorbing device has an external force input part for receiving the external force, the external force input part is connected to a center part of the damping mechanism, and the annular groove in the damping mechanism is formed in a region peripheral to and about the external force input part.

7. The sensor of claim 1, wherein the two side walls of the annular groove are inclined at the same angle relative to the center axis of the damping mechanism.

8. The sensor of claim 1, wherein the annular groove takes the form of a ring.

9. The sensor of claim 1, wherein the damping mechanism is disc shaped, and the radially inner-most part of annular groove formed in the front surface of the damping mechanism is located radially further inwardly of the damping mechanism than any portion of the second annular groove formed in the rear surface of the damping mechanism.

10. The sensor of claim 1, wherein the damping mechanism is disc shaped, and the radially outer-most part of second annular groove formed in the rear surface of the damping mechanism is located radially further outwardly of the damping mechanism than any portion of the annular groove formed in the front surface of the damping mechanism.

11. The sensor of claim 1, wherein the shock absorbing device has an input part to which the external force is directly applied, a securing part for securing the force sensor at a prescribed location, and a chip seat for attaching the support part of the force sensor chip to the securing part of the shock absorbing device.

12. The sensor of claim 11, wherein the shock absorbing device further has an external force transmitting part for connecting the input part and the action part of the force sensor chip.

13. The sensor of claim 12, wherein the sensor has a dual surface joined structure in which the chip seat and the external force transmitting part are connected to different sides of the force sensor chip.

14. The sensor of claim 12, wherein the sensor has a single surface joined structure in which the chip seat and the external force transmitting part are connected to the same side of the force sensor chip.

15. A force sensor, comprising:

a force sensor chip for detecting an external force; and a shock absorbing device for damping the external force and imparting the damped external force to an action part of the force sensor chip, wherein the shock absorbing device has a damping mechanism for damping the external force, the damping mechanism having an annular groove formed in at least a front surface thereof, wherein the action part is positioned in a center part of the force sensor chip, a support part is peripherally positioned so as to surround the action part, connecting parts are positioned between and connecting the action part and the support part, and a plurality of strain resistance elements are disposed on one surface of the force sensor chip in a boundary part between each of the connecting parts and the action part, wherein the damping mechanism includes, additionally to the annular groove formed in the front surface thereof as a first one, a second annular groove formed in a rear surface thereof, wherein the damping mechanism is disc shaped, and the radially inner-most part of first annular groove formed in the front surface of the damping mechanism is located radially further inwardly of the damping mechanism than any portion of the second annular groove formed in the rear surface of the damping mechanism.

16. The sensor of claim 15, wherein the shock absorbing device has an input part to which the external force is directly applied, a securing part for securing the force sensor chip at a prescribed location, and a chip seat for attaching the support part of the force sensor chip to the securing part of the shock absorbing device.

17. The sensor of claim 16, wherein the shock absorbing device further has an external force transmitting part for connecting the input part and the action part of the force sensor chip.

18. The sensor of claim 17, wherein the sensor has a dual surface joined structure in which the chip seat and the external force transmitting part are connected to different sides of the force sensor chip.

19. The sensor of claim 17, wherein the sensor has a single surface joined structure in which the chip seat and the external force transmitting part are connected to the same side of the force sensor chip.

20. A force sensor comprising:

a force sensor chip for detecting an external force; and a shock absorbing device for damping the external force and imparting the damped external force to an action part of the force sensor chip, wherein the shock absorbing device has a damping mechanism for damping the external force, the damping mechanism having an annular groove formed in a rear surface thereof, wherein the action part is positioned in a center part of the force sensor chip, a support part is peripherally positioned so as to surround the action part, connecting parts are positioned between and connecting the action part and the support part, and a plurality of strain resistance elements are disposed on one surface of the force sensor chip in a boundary part between each of the connecting parts and the action part, wherein the annular groove is defined by two side walls inclined relative to a center axis of the damping mechanism such that the two side walls are directed toward the force sensor chip.

21. The force sensor of claim 20, wherein the damping mechanism is disc shaped.

22. The force sensor of claim 20, wherein the shock absorbing device has an external force input part for receiving the external force, the external force input part is connected to a center part of the damping mechanism, and the annular groove formed in the damping mechanism is formed in a region peripheral to and about the external force input part.

23. The sensor of claim 20, wherein the two side walls of the annular groove are inclined at the same angle relative to the center axis of the damping mechanism.

24. The sensor of claim 20, wherein the annular groove takes for form of a ring.

25. The sensor of claim 20, wherein the shock absorbing device has an input part to which the external force is directly applied, a securing part for securing the force sensor chip at a prescribed location, and a chip seat for attaching the support part of the force sensor chip to the securing part of the shock absorbing device.

26. The sensor of claim 25, wherein the shock absorbing device further has an external force transmitting part for connecting the input part and the action part of the force sensor chip.

27. The sensor of claim 26, wherein the sensor has a dual surface joined structure in which the chip seat and the external force transmitting part are connected to different sides of the force sensor chip.

28. The sensor of claim 26, wherein the sensor has a single surface joined structure in which the chip seat and the external force transmitting part are connected to the same side of the force sensor chip.

* * * * *